(12) United States Patent
Yializis et al.

(10) Patent No.: US 11,072,148 B2
(45) Date of Patent: Jul. 27, 2021

(54) RECYCLABLE PAPER-CONTAINING PACKAGING WITH RADIANT BARRIER INSULATION

(71) Applicant: SIGMA TECHNOLOGIES INT'L., LLC, Tucson, AZ (US)

(72) Inventors: Steven Yializis, Tucson, AZ (US); Luke Rogers, Tucson, AZ (US)

(73) Assignee: SIGMA TECHNOLOGIES INT'L, LLC, Tucson, AZ (US)

( * ) Notice: Subject to any disclaimer, the term of this patent is extended or adjusted under 35 U.S.C. 154(b) by 11 days.

(21) Appl. No.: 16/238,998

(22) Filed: Jan. 3, 2019

(65) Prior Publication Data

US 2019/0210324 A1    Jul. 11, 2019

Related U.S. Application Data

(60) Provisional application No. 62/614,568, filed on Jan. 8, 2018.

(51) Int. Cl.
*B32B 29/00* (2006.01)
*B32B 15/085* (2006.01)
(Continued)

(52) U.S. Cl.
CPC ........... *B32B 15/085* (2013.01); *B32B 5/02* (2013.01); *B32B 15/082* (2013.01); *B32B 15/09* (2013.01); *B32B 15/095* (2013.01); *B32B 15/20* (2013.01); *B32B 27/10* (2013.01); *B32B 27/302* (2013.01); *B32B 27/304* (2013.01); *B32B 27/32* (2013.01); *B32B 27/36* (2013.01); *B32B 27/40* (2013.01); *B32B 29/002* (2013.01); *B32B 29/06* (2013.01); *B32B 29/08* (2013.01); *B65D 65/403* (2013.01); *B65D 65/42* (2013.01); *B65D 81/38* (2013.01);
(Continued)

(58) Field of Classification Search
CPC .......................... B65D 1/0215; B32B 2439/00
USPC ........................................................ 53/473
See application file for complete search history.

(56) References Cited

U.S. PATENT DOCUMENTS

| | | | |
|---|---|---|---|
| 4,952,278 A * | 8/1990 | Gregory | D21H 11/18 162/141 |
| 2011/0020570 A1 * | 1/2011 | Wadsworth | B65D 5/0236 428/34.2 |

(Continued)

*Primary Examiner* — Andrew M Tecco
*Assistant Examiner* — Eyamindae C Jallow
(74) *Attorney, Agent, or Firm* — Yakov Sidorin; Quarles & Brady LLP

(57) ABSTRACT

Material for packaging—and package or receptacle made of such material—that contains a particular aluminized polymeric film with emissivity of equal to, or less than 0.10 and yet sufficiently thin to withstand and satisfy industrial requirements of the recycling process due to substantially complete oxidization of aluminum during the recycling. An optional protective coating (less than one micron in thickness) may be added to protect aluminum in the film from corrosion during the normal use of the packaging. Protective coating is configured to not raise emissivity of the aluminized surface above the 0.10 value and, at the same time, to still allow for the aluminum material it covers to be removed due to becoming fully oxidized and corroded in the heat and at humidity levels used in the recycling/repulping process. Proposed configuration permits the aluminum of the packaging material to be included in the recycled portion of the packaging material.

15 Claims, 5 Drawing Sheets

(51) Int. Cl.
  *B32B 29/06* (2006.01)
  *B32B 27/10* (2006.01)
  *B32B 27/30* (2006.01)
  *B32B 5/02* (2006.01)
  *B32B 15/082* (2006.01)
  *B32B 15/09* (2006.01)
  *B32B 15/095* (2006.01)
  *B32B 15/20* (2006.01)
  *B32B 27/32* (2006.01)
  *B32B 27/36* (2006.01)
  *B32B 27/40* (2006.01)
  *B32B 29/08* (2006.01)
  *B65D 65/40* (2006.01)
  *B65D 65/42* (2006.01)
  *B65D 81/38* (2006.01)

(52) U.S. Cl.
  CPC ....... *B32B 2255/06* (2013.01); *B32B 2255/10* (2013.01); *B32B 2255/205* (2013.01); *B32B 2255/26* (2013.01); *B32B 2255/28* (2013.01); *B32B 2262/0238* (2013.01); *B32B 2262/0253* (2013.01); *B32B 2262/0284* (2013.01); *B32B 2262/0292* (2013.01); *B32B 2307/30* (2013.01); *B32B 2307/732* (2013.01); *B32B 2439/00* (2013.01)

(56) References Cited

U.S. PATENT DOCUMENTS

| | | | |
|---|---|---|---|
| 2014/0272163 A1* | 9/2014 | Tilton | B27N 3/04 427/427.4 |
| 2016/0343275 A1* | 11/2016 | Hutter | B32B 3/20 |
| 2017/0129216 A1* | 5/2017 | Shimizu | B32B 15/08 |
| 2017/0188751 A1* | 7/2017 | Resurreccion, Jr. | B32B 27/288 |
| 2017/0266935 A1* | 9/2017 | Chen | B32B 27/10 |
| 2017/0320305 A1* | 11/2017 | McMillan | B32B 27/10 |
| 2018/0022073 A1* | 1/2018 | Sasaki | B32B 27/36 428/35.7 |

* cited by examiner

| Stickies Count on Pressed Pulp Sheets ||
|---|---|
| Type of Coating Over Aluminum | # of Stickies |
| 0.70 micron Fischer Tropsch Wax | 3 |
| 1.05 micron Fischer Tropsch Wax | 294 |
| 0.98 micron Thermoset Copolymer | 0 |

*Fig. 8*

RECYCLABLE PAPER-CONTAINING PACKAGING WITH RADIANT BARRIER INSULATION

CROSS-REFERENCE TO RELATED APPLICATIONS

The present international application claims priority from and benefit of the U.S. Provisional Patent Application No. 62/614,568 filed on Jan. 8, 2018, the disclosure of which is incorporated by reference herein.

TECHNICAL FIELD

Embodiments of the present invention relate to radiant barrier insulation configured for use in paper-containing packaging, where such packaging is intended and structured to be recyclable and/or recycled as paper, and, in particular, to such radiant barrier insulation in which a radiant barrier material is used to facilitate thermal insulation in packaging intended to preserve temperature sensitive food or pharmaceutical goods.

SUMMARY

Embodiments of the invention provide a recyclable packaging that includes (i) a paper layer with first and second surfaces; (ii) a polymer layer with third and fourth surfaces, where the third surface is affixed to the second surface; (iii) an aluminum layer deposited on the fourth surface (here, the aluminum layer has a first thickness of 200 nanometers or less to cause emissivity of an outer surface of the packaging to be equal to or smaller than a first value of 0.10). The aluminum layer is characterized by becoming fully oxidized with no visible aluminum present in (accepted for forming the recyclable packaging) material that results from the packaging being subjected to a particular treatment. Such particular treatment includes a) blending the packaging in a Waring Blender to form a first material; b) disintegrating the first material into water with a British Disintegrator at 125 (±10) degrees F. at 3000 rpm to form a second material; c) separating the second material in a 0.01 inch screen with a 1 inch water head for 20 minutes to form a fourth material; and d) drying the fourth material in an oven for 4 hours at 221 degrees F. In one embodiment, the recyclable packaging may additionally include a protective coating, over the aluminum layer, which has a second thickness of 1 micron or less. (The second thickness is defined to maintain the first value of the emissivity of the outer surface after the aluminum layer has been coated with the protective coating and to prevent oxidation of the aluminum layer during normal use of the packaging, while the protective coating does not impede oxidation of the aluminum layer caused by the treatment.) Alternatively or in addition, the protective coating may include a material selected from: wax, polymer, and lacquer. In any embodiment, the polymer layer may include a material selected from: low density polyethylene, high density polyethylene, polyethylene terephthalate, polypropylene, polyvinyl chloride, polyurethane, and polystyrene. In any embodiment, the polymer layer may include a material selected from film and fabric.

Embodiments of the invention additionally provide a recyclable packaging that contains (i) a paper layer with first and second surfaces; (ii) a polymer layer with third and fourth surfaces, wherein the third surface is affixed to the second surface; (iii) an intermediate coating applied to the fourth surface; (iv) an aluminum layer carried by the intermediate coating (where the aluminum layer has a first thickness of 200 nanometers or less and where the aluminum layer causes an outer surface of the packaging to have emissivity that is equal to or smaller than a first value of 0.10). Such aluminum layer is characterized by becoming fully oxidized with no visible aluminum present in a recyclable material (suitable for manufacture of the recyclable packaging) that results from the packaging being subjected to a treatment that includes a) blending in a Waring Blender; b) disintegrating into water with a British Disintegrator at about 125 (±10) degrees F. at 3000 rpm; c) separating in a 0.01 inch screen with a 1 inch water head for 20 minutes; and d) drying in an oven for 4 hours at 221 degrees F. In one implementation, the aluminum layer is disposed directly on the intermediate coating. In any implementation, the intermediate coating may have a thickness between 10 nm and 2000 nm and include a material selected from polymer and oligomer. In any implementation, the recyclable packaging may additionally include a protective coating over the aluminum layer (such protective coating having a second thickness of 1 micron or less, the second thickness being defined i) to maintain the emissivity of the outer surface of the packaging at the first value after the aluminum layer has been coated with the protective coating and ii) to prevent oxidation of the aluminum layer during normal use of the packaging, while the protective coating does not impede oxidation of the aluminum layer as a result of the treatment). Alternatively or in addition, the protective coating may include a material selected from wax, polymer, and lacquer and/or the polymer layer may include a material selected from low density polyethylene, high density polyethylene, polyethylene terephthalate, polypropylene, polyvinyl chloride, polyurethane, and polystyrene. In any embodiment, the polymer layer may be configured as a film or fabric.

Embodiments of the invention additionally provide a method for thermally insulating a good within a recyclable packaging. The method includes placing a reflective insulation material at a pre-defined proximity distance from the good, where pre-defined proximity distance is chosen to provide adequate thermal insulation to the good. In one embodiment, the reflective insulation material is used to wrap or otherwise enclose the good. In any embodiment the reflective insulation material includes the recyclable packaging that contains: (i) a paper layer with first and second surfaces; (ii) a polymer layer with third and fourth surfaces, wherein the third surface is affixed to the second surface; (ii) an intermediate coating applied to the fourth surface; (iii) an aluminum layer carried by the intermediate coating, which aluminum layer has a first thickness of no more than 200 nanometers to cause an outer surface of the packaging to have emissivity that is equal to or smaller than a first value of 0.10, and which aluminum layer becomes fully oxidized with no visible aluminum present in a material as a result of subjecting the recyclable packaging to a pre-defined treatment. The pre-defined treatment includes a) blending the packaging in a Waring Blender to form a first material; b) disintegrating the first material into water with a British Disintegrator at 125 (±10) degrees F. at 3000 rpm to form a second material; c) separating the second material in a 0.01 inch screen with a 1 inch water head for 20 minutes to form a fourth material; and d) drying the fourth material in an oven for 4 hours at 221 degrees F.

Embodiments further provide a method for manufacturing a recyclable packaging, the method containing steps of attaching a polymer layer to a paper layer (here, an inner surface of the polymer layer is affixed to a first surface of the paper layer); depositing an aluminum layer on the polymer layer (with the aluminum layer having a first thickness of 200 nanometers or less and being configured to cause an outer surface of the polymer layer to have emissivity that is equal to or smaller than a first value of 0.10), which aluminum layer possesses a quality of becoming fully oxidized with no visible aluminum when the packaging is exposed to a treatment that includes: a) blending in a Waring Blender; b) disintegrating into water with a British Disintegrator at 125 (±10) degrees F. at 3000 rpm; c) separating in a 0.01 inch screen with a 1 inch water head for 20 minutes, and d) drying in an oven for 4 hours at 221 degrees F. Alternatively or in addition, the method may include a step of applying a protective coating over the aluminum layer (where the protective coating has a second thickness of 1 micron or less, and where the second thickness is defined a) to maintain the emissivity of the outer surface at the first value after the aluminum layer has been coated with the protective coating and b) to prevent oxidation of the aluminum layer during normal use of the packaging, while the protective coating does not impede oxidation of the aluminum layer as a result of the treatment.

Embodiments additionally provide a method for thermally insulating a good within a recyclable packaging. Such method involves placing a reflective insulation material in a pre-defined proximity with a good, the pre-defined proximity being suitably chosen to provide adequate thermal insulation to the good, wherein said reflective insulation material comprises the recyclable packaging that includes: —a paper layer with first and second surfaces; —a polymer layer with third and fourth surfaces, wherein the third surface is affixed to the second surface; —an aluminum layer deposited on the fourth surface (where the aluminum layer has a first thickness of 200 nanometers or less and where the aluminum layer causes an emissivity of an outer surface of the packaging to be equal to or smaller than a first value of 0.10, which aluminum layer is characterized with a property of becoming fully oxidized with no visible aluminum present in a material that results from the packaging being subjected to a pre-determined treatment. The pre-determined treatment is defined to include a) blending the packaging in a Waring Blender to form a first material; b) disintegrating the first material into water with a British Disintegrator at 125 (±10) degrees F. at 3000 rpm to form a second material; c) separating the second material in a 0.01 inch screen with a 1 inch water head for 20 minutes to form a fourth material; and d) drying the fourth material in an oven for 4 hours at 221 degrees F.

BACKGROUND

A variety of thermal insulation materials are used for perishable and other temperature sensitive goods. Common types of thermal insulation include rigid and flexible foams, bags or batts of fibrous materials, and reflective insulation. Reflective Insulation is any type of insulation intended to insulate against heat gain and heat loss by reducing, reflecting, or not emitting radiant heat; this is accomplished by applying a low emissivity material, such as aluminum, to one or more surfaces. Simply incorporating a low emissivity material as part of the package could reduce the weight or dimensions of the total package, as compared for example to other types of insulation commonly used in packaging (such as foams or bulk fibrous insulation). However, current methods and applications of low-emissivity material impairs the recyclability of the total package, which understandably causes problems in related industries. Thus, there is a need for low-emissivity packaging material that is fully recyclable.

BRIEF DESCRIPTION OF THE DRAWINGS

The invention will be more fully understood by referring to the following Detailed Description of Specific Embodiments in conjunction with the not-to scale Drawings, of which:

FIG. 8 contains plots illustrating changes in emissivity figure(s) as a function of thickness of protective coating layer(s) made of itemized materials.

Figure 1:
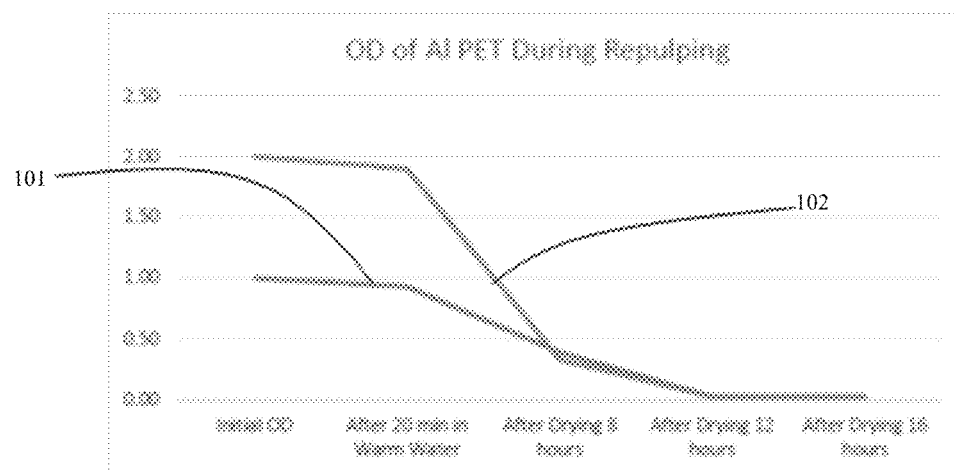
FIG. 1 is a graphical representation of the variations of optical density of Aluminum Polyester as a function of time, during simulated repulpability test conditions.

The sizes and relative scales of elements in Drawings may be set to be different from actual size and scales to appropriately facilitate simplicity, clarity, and understanding of the Drawings. For the same reason, not all elements present in one Drawing may necessarily be shown and/or labeled in another.

DETAILED DESCRIPTION

Embodiments of the invention address the problem(s) caused by inability of the related art to fully recycle a low-emissivity packaging material, and solve such problem(s) by using a specifically structured packaging that contains a particular aluminized polymeric film characterized by emissivity of equal to, or less than 0.10, yet is thin enough such that when the packaging material is subjected to the recycling process, what little amount of aluminum is present is "crumbled" and fully oxidized (and, as a result, does not affect the recyclability of the packaging material as a whole). Such specifically-structured aluminized polymeric film may have an optional protective coating (which would be generally less than one micron in thickness) to protect the aluminum in the film from corrosion during the use of the packaging. However, this protective coating is judiciously configured to not raise the emissivity of the aluminized surface above the 0.10 value and, at the same time, to still allow for the aluminum material it covers to be removed in the repulping and recycling process such that the aluminum material in the stack of materials of the packaging is factually fully oxidized and corroded in the heat and at humidity levels used in the recycling process. It is this specific configuration that permits the aluminum of the packaging material to be included in the recycled portion of the packaging material.

Repulping is the first stage in paper recycling. Features of the method employed for testing the repulpability of a paper-based containers are summarized in Part I of the document titled "The Voluntary Standard For Repulping and Recycling Corrugated Fiberboard Treated to Improve Its Performance in the Presence of Water and Water Vapor", published by the Fibre Box Association (available at fibrebox.org), the disclosure of which is incorporated herein by reference for all purposes. This test method is recognized in related industry—and, in particular, by the Fibre Box Association and Corrugated Packaging Alliance—and represents the commonly-used test, the exposure of a given container or packaging to which is required to be able to determine whether such given corrugated container or packaging can be classified as repulpable or recyclable. The first part of this test method addresses repulpability. In particular, a sample/portion of the container is blended in a Waring Blender and disintegrated into water with a British Disintegrator at 125 (±10) degrees F. at 3000 rpm, and separated in a 0.01" screen with a 1 inch water head for 20 minutes. The specimens of the resulting material are then dried in an oven for 4 hours at 221 degrees F. to remove water. The dried weights (of what passes through the screen after such a treatment) is compared to rejects (or what is rejected by the screen). The material that passed through is considered/defined to be repulpable, implying that such material can be used, according to industrial standards, to be reused/remade into paper at a mill. At the same time, the rejects that are left behind by the screen are considered to be the unusable waste and, generally, are rejected and sent to the landfill or otherwise disposed of. It is well recognized that in order for the container material to pass the first stage of this test, a portion of at least 85 weight-% of the total, overall amount of the initial container material has to be classified as repulpable.

The second stage of the test involves the use of the accepted pulp for making paper. Here, using a Carver press at 350 degrees F. at 500 psi, the accepted pulp (sometime referred to as "accepts") is pressed together to form hand sheets, and the excess moisture is blotted away. Then several (often—three) hand sheets of the so-formed new paper are inspected for defects or "spots". This inspection is aided by TAPPI-developed test methods. TAPPI is a registered, not-for-profit, international Non-Governmental Organization, see tappi.org, involved in research and development in the fields of pulp, paper, and packaging (such as corrugated fiberboard, flexible packaging, lamination, adhesives, coatings and extrusion). This organization, among other things, develops and provides industry standards and test methods. Guidance for identifying spots include assessment of visually-recognizable discoloration (according to TAPPI T-537 and TAPPI T-563, incorporated herein by reference and available at tappi.org/Publications-Standards/Standards-Methods/), and assessment of physical adhesion of a spot to pulp caused by melted plastic or "stickies" (according to TAPPI T-277, also incorporated herein by reference and available at tappi.org/Publications-Standards/Standards-Methods/).

For example, if a small amount of dirt or aluminum foil comes through the paper and makes its way into the pulp during the repulping phase, it could be made into paper, but could at the same time leave the paper with visual blemishes, and would be a cause for rejection of the final paper product. Alternatively, if a polymeric coating disposed over a paper layer is adhered to the pulp and makes it through the filter with the pulp during the repulping phase (in either a liquid form or in small enough pieces, for example), such piece of polymeric coating would be re-softened or re-melted in the paper-making process and could cause "sticky" areas or portions (referred to as "stickies"), in the newly-formed paper, that affect the physical properties of such paper. It is known in industry that for the newly-formed paper to be accepted and the final product to be considered recyclable according to this test, no more than 15 of either kind of spots can be present (when visually observed) in an area that is equal to or greater than 0.4 square mm. An inert material that is both visually transparent (therefore resulting in no visually-recognized defects) and that does not adhere to paper material at 350 degrees F. (thereby preventing the formation of sticky areas in the mater material) would not be a cause for rejection, according to such test.

Notably, practically all perishable or temperature sensitive goods shipped in small volumes are shipped with the use of corrugated cardboard boxes, which are easily and commonly recycled. According to the "Advancing Sustainable Materials Management: 2014 Fact Sheet", for example, published by the EPA (and available at epa.gov/facts-and-figures-about-materials-waste-and-recycling/advancing-sustainable-materials-management), cardboard boxes were recycled at a rate of 89.5%, whereas PET plastic bottles were recycled at a rate of 31.2%, and HDPE plastic bottles were recycled at a rate of 29.5%, with other plastic materials being recycled at lower rates. In practice, few insulating products are as easy to recycle as a corrugated cardboard box.

For the category of insulating products referred to as reflective insulation or radiant barrier, the thermal performance is highly dependent on the surface emissivity. Emissivity represents the ability for heat, provided by a given surface, to radiate from the surface into an adjacent air space. As used herein, the term emissivity (of the surface of a material) is generally referred to the effectiveness of such surface in emitting energy as thermal radiation, that is as the material's ability to emit energy as IR radiation (and not visible light), in the range between about 700 nm and about 1 micron wavelengths. Emissivity is commonly measured according to the test method discussed in ASTM C1371 (available at astm.org/Standards/C1371.htm and incorporated herein by reference), for example with the use of a tabletop portable emissometer. The value of emissivity is stated as a number between 0 and 1, where 0 represents the case of emission of no radiant heat and 1 represents the case of emission of all radiant heat from a given surface. The higher the emissivity value, the more heat is emitted; and the lower the emissivity, the less heat is emitted. For the purposes of the product comparison, the emissivity of typical brown paper used in corrugated cardboard boxes has a value between 0.80 and 0.90, aluminized paper has an emissivity value between 0.10 and 0.50, aluminum foil or aluminized film with a polymeric film applied to both sides of such film has emissivity between 0.20 and 0.70, and aluminized polymeric film without any protection over the aluminum has emissivity between 0.03 and 0.05. When insulating an object with a low emissivity surface facing the air space, the lower the emissivity of the surface, the better quality of the insulation. The ASTM C1313 (available at astm.org/Standards/C1313.htm and incorporated herein by reference) is the industry standard specification for a radiant barrier, and defines a radiant barrier as a material having an emissivity of 0.10 or less, used in the construction of an insulating system. (There currently appears to be no maximum value of emissivity for a material to be called a reflective insulation.)

The sizes of the air spaces, formed during the insulation of a given workpiece or good, also makes a difference for the quality of insulation of the workpiece of good. During the propagation of heat flow through a given air space, a certain percent of heat travels (is transferred) with moving air (or via convection), and a certain percent of heat propagates in the form of infrared radiation. When the heat is transferred downward, convection is minimized and the predominant means of heat transfer is radiation. In this case, the larger the air space between the packaging and the good, the better the quality of insulation. Circumstances change, however, when the flow of heat is directed upward or sideways, as convection in this case has a greater impact. In these cases, practical balance must be found in that a sufficiently large air space (between the container or wrapper and the workpiece or good, which this container/wrapper protects) should be identified the size of which is, nevertheless, is judiciously limited to not allow for easy air movement inside the air space. In Chapter 26, Table 3 of the Handbook of Fundamentals by America Society of Heating, Refrigerating, and Air0Conditioning Engineers, or ASHRAE (available at ashrae.org/technical-resources/ashrae-handbook/ashrae-handbook-online), which is incorporated herein by reference, insulation values are provided for differently sized air spaces (ranging from ½ inch to 3.5 inches) and at different temperature settings, with surfaces of varying emissivities (from 0.03 to 0.82). In Table 1 of that document, surfaces with emissivities of 0.05 and 0.20 are given as examples of "reflective" and 0.90 is called out as an example of "non-reflective" surfaces. According to ASHRAE, a ¾ inch air space has a greater overall insulation value than a ½ inch air space for upward and sideways heat flow, but at 1 inch of space the insulation value diminishes. When it comes to insulated packaging and shipping, air spaces may conceivably be smaller than ½ inch, and multiple insulated liners could be used.

A person of skill in the art will readily recognize that a variety of different products may be used to reduce the emissivity of a given surface. The use of aluminum foil, for example, is a common approach, as aluminum foil is relatively inexpensive. Aluminum foil has very low mechanical strength, but is easy enough to handle when laminated to paper. In the lamination process, a foil with thickness of 6 to 18 microns is commonly preferred in industry (as at these thicknesses, the aluminum foil has some protection against oxidation and corrosion when exposed to high heat and moisture). Aluminum oxide develops on the outermost layer of the foil, but only in a "skin layer" of it—down to tens of nanometers at the thickest—and typically does not propagate deeper into the body of the foil. As a result, after the initial value of the foil's emissivity (of 0.03 to 0.05) increases to about 0.08 to 0.12, the value of emissivity of the oxidized surface of the aluminum foil remains relatively constant and stable.

Another industrial test, ASTM D3310 (the description of which is available at astm.org/Standards/D3310.htm and is incorporated herein by reference), is used to test resistance of a material to corrosion, and is specifically called out as the preferred test for a radiant barrier per ASTM C1313. (Emissivity testing after corrosion resistance testing is one method of testing, but the ASHRAE Handbook, Chapter 26, Table 2, specifically calls out a few specific surfaces and materials, including bright aluminum foil as having an emissivity of 0.05 and aluminum sheet as having an emissivity of 0.12.) A recognized disadvantage to using an aluminum foil in an insulating packaging container is that the aluminum foil is very difficult to remove from the paper if such a container is to be repulped or recycled. In particular, the aluminum foil is so soft that it can and often does break apart or crumble, and its crumbs or particles make their way into the paper pulp.

The use of aluminized paper is considered to be another approach. Here, using a vacuum deposition process, such as sputtering or electron beam evaporation, a low emissivity aluminum layer is applied to a paper. Since the amount of aluminum applied using this method is miniscule (200 nanometers or less in thickness), the weight of the aluminum layer is insignificant compared to the weight of the paper products. Therefore, it is generally assumed that when aluminized paper is submitted for repulping, it is easily able to meet the requirement that at least 85% is made into usable pulp, and that the exact weight of the aluminum is practically unmeasurable in the confines of the repulpability test. Since these papers may generally contain clay coatings, lacquer coatings, printed inks, and other materials that could contribute to a failure from "spots" or "stickies" in the recyclability test, the ratio of non-paper to paper products is minimized, aluminum included. Since the paper generally does not have a smooth, planar surface, the emissivity of the paper surface does not reach as low a value as that of aluminum foil. Depending on the type of paper, the amount of moisture in the paper, roughness of the paper surface and some other factors, we measured the emissivity of aluminized paper samples to be between 0.50 and 0.10. In fact, ASHRAE lists "Aluminum coated paper, polished" as having an emissivity of 0.20. Understandably, lower values of emissivity are always preferred for reflective insulation, and a range in emissivity values that large, and with emissivity values still not qualifying it as a radiant barrier, aluminized paper leaves much to be desired. Combined with the fact that paper naturally contains a certain amount of moisture and that the aluminum may be uncoated or unprotected, the aluminized paper remains susceptible to corrosion in the presence of steam or condensation, which may occur in the normal use of packaging perishable goods. All in all, while aluminized paper may arguably present a better (from the point of view of repulpability and recycling) option than paper with aluminum foil laminated on it, the operational properties of the aluminized paper are substantially sacrificed to achieve such improved repulpability/recycling properties.

Yet another material that can be considered to achieve low emissivity is a metalized polymeric film. Notably, because such film is not paper itself, it simply cannot be repulped for paper recycling, and instead must be separated from the paper to which it is affixed, beforehand, to allow the remaining paper portion to be recycled. The aluminum or other metal can be applied to a film by vacuum deposition, like sputtering or electron beam evaporation (by analogy with the process of formation of the aluminized paper), but the higher figure of flatness of the surface of the film facilitates the achievement of lower emissivity value even at thicknesses of metallic material of 200 nanometers or less. For example, it was empirically shown in one of our studies that the aluminized polyethylene terephthalate film can achieve an emissivity value of 0.03, while the aluminized low density polyethylene film can achieve an emissivity value of 0.05. The advantage of using a polymeric film for intended purposes is that such film contains little to no moisture, can be coated onto the chosen surface prior to metallization to further smooth the surface, and the metallic material can even be further covered with a coating or film after metallization to further protect it from corrosion. A light top coating, less than one micron, may increase the emissivity over the level of 0.03 but still keep it below 0.10, while a thick 6 micron to 24 micron polymer film laminated over the aluminum can increase the emissivity to 0.20 to 0.70 (depending on the film thicknesses and types of polymers). (As a comparison, plain brown kraft paper has an emissivity of 0.80, and regular glass has an emissivity of 0.84.) If a metalized film is going to be coated for corrosion protection though, the coating must be thin enough for it to not absorb significant radiant heat and significantly increase the emissivity.

There are a few metalized film products on the insulated packaging market. One such product is a low density polyethylene bubble packaging material with an aluminized polyethylene terephthalate film facer on one or both sides, making an insert, pouch, or envelope to contain perishable goods. One challenge with this product is that it is a mixed polymer. The Society of the Plastics Industry (SPI) Resin Identification Code and ASTM D7611 (available at astm.org/Standards/D7611.htm) put mixed polymers in the category of "other", numbered with a 7. Blue Apron explains says their bubble liner is "fully recyclable" but as a category 7, would be very difficult to recycle and would often be excluded from recycling streams altogether, ending up in the landfill. It can vary by the community to community whether or not it can be collected and how it can be handled. The State of California has a "CA Cash Refund" program in place to take such items, but other states do not.

An example of a product that advertises sustainability and uses a reflective insulation is a box liner called "northbox" made by Cascades Inc. Each wall of the liner includes two aluminized layers, each between two layers of polymeric films, with each of those polymeric film/aluminum/polymeric film layer structure separated by a honeycomb paper structure, and the entire assembly is inserted into the shipper box. The Cascades Inc. describes the reason for applying a polymeric film to both sides of the aluminum as "eliminating the risk of crumbling in the pulp during the recycling process", similar to the problems incurred with aluminum foil/paper laminates described above. As was already alluded to above, however, thin aluminum is especially vulnerable when exposed to water and humidity and corrodes easily if not adequately protected. The polymeric film on both sides of the aluminum serves dual purposes of both preventing the aluminum from crumbling off and getting into the pulp in the recycling process, and preventing corrosion that might occur with an unprotected aluminized film in use during the life of the packaging product. A benefit to the "northbox" product is that it is described as being "pulper-safe" and is illustrated in the Cascade's literature as the film/aluminum/film assembly being fully removed in the pulping process without the aluminum ever making its way into the pulp. There are two problematic issues with a Cascade's product and similar products, however. First, the polymeric films used to protect the aluminum dramatically increase the emissivity, resulting in a product that—while being reflective to visual light—is not nearly as heat-reflective as bare aluminum, and simply does not qualify as a radiant barrier. Second, the films add additional plastic weight, which when processed at the paper recycling mill, is additional waste destined for the landfill instead of being repulped. The ratio of weight of paper to weight of non-paper in a product is one factor in determining if a product can be called repulpable or recyclable as paper.

When a radiant barrier/reflective insulation is to be repulped and recycled as paper, the preferred/ideal product or material from which such radiant barrier/reflective insulation is made would be one in which:

The emissivity of at least one surface is 0.10 or less for optimum performance;

The aluminum present in the preferred material is prevented or protected from corrosion or otherwise unlikely to corrode in normal use, where the normal use is defined as the conditions that the product could reasonably be expected to be subjected to during shipping. For example, if the material is on the inside of a cardboard box and the goods being insulated are within that box, the normal use would be having that box ship across the country. Whereas, if the material is not on the inside surface of the box, but instead located as an insert within the box, then the outside box may provide additional protection from the elements, from temperature variations, from humidity, etc. If the material is instead configured as a mailer or envelope, then it may not be protected as well as if it were in a box.

The process of protecting the aluminum in the material or product does not result in excess ratio of the weight of the protective layer to paper, so as to more easily meet the 85%/15% ratio of repulped material to rejected material when tested according to the "The Voluntary Standard For Repulping and Recycling Corrugated Fiberboard Treated to Improve Its Performance in the Presence of Water and Water Vapor" repulpability test. Additionally, the protective layer should be sufficiently thin to maintain the desired emissivity of the aluminum surface of the material, and be sufficiently thick to prevent oxidation of the aluminum surface during normal use of the packaging, but does not impede oxidization of the aluminum surface as a result of the treatment. The amount of protection the protective layer or coating needs to provide will depend on the products normal and expected use. Overall, the protective coating needs to ensure that the outer surface of the material used for packaging maintains the required emissivity;

Any material that does make it through the repulping process is able to be made into paper without excess "spots" or "stickies" per "The Voluntary Standard for Repulping and Recycling Corrugated Fiberboard Treated to Improve Its Performance in the Presence of Water and Water Vapor" recyclability test.

While flakes, specs or spots of reflective material would certainly contribute to a product's disqualification in the recyclability portion of the test, we discovered surprisingly that the use of a very thin coating over the aluminum as protection against corrosion (as opposed to the use of an aluminum foil or a aluminized layer encapsulated within polymeric film) allows to maintain the low level of emissivity while offering the protection against corrosion and, at the same time, minimizing the weight of a portion of the material that is unable to be made into usable pulp. Because the thickness of the aluminum used in an embodiment of the invention is so thin, any aluminum that does make it into (is processed into) the accepts portion produced by the repulping process ends up being fully oxidized and corroded in the heat and humidity levels used in the process. Aluminum oxide is visually transparent, when observed with the human eye (that is, substantially not visible or not visually-perceivable), and thus, for the purposes of this disclosure and the claims, the aluminum is considered fully oxidized when the aluminum is substantially transparent instead of silver-colored, for example. Using an optical densitometer, the optical density of the aluminum can be measured. Optical density is a measurement of transparency/opacity of the material, and is often defined as the logarithmic ratio of the radiation incident on the material to the radiation transmitted by the medium (at a given wavelength). Since aluminum oxide is transparent and un-oxidized aluminum has varying opacity depending on its thickness, the aluminum is considered to be transparent, for the purposes of this disclosure, when the optical density (OD) is less than 0.09. This threshold value was determined based on the following observations. Bright white paper or pulp, which would result in aluminum sticking out the most, had a maximum of 253 lumens, a minimum of 219 lumens, and a mode of 248 lumens. According to TAPPI T-563, the software will count as a spot anything darker (lower) than 30 lumens below the chosen mode. This means that while darker areas may be detected, they are not counted if they are close enough in optical properties to the background. In this case, 30 below the mode would be 218 lumens.

In one case, a sample of bright white paper with a gradient of aluminum (analyzed according to TAPPI T 563) had a brightness of a maximum of 251 lumens, a minimum of 168 lumens, and a mode of 247 lumens. This sample allowed the software to plot a curve of the areas 30 below the mode. By looking at the curve on the identical film sample, we could determine that the average optical density across the curve was 0.092. Since the accuracy of the a typical optical densitometer is limited at about 0.001, the performed measurements allowed us to conclude with confidence that the optical density of aluminum required to pass the TAPPI T 563 test should be less than OD 0.09.

Figure 2:
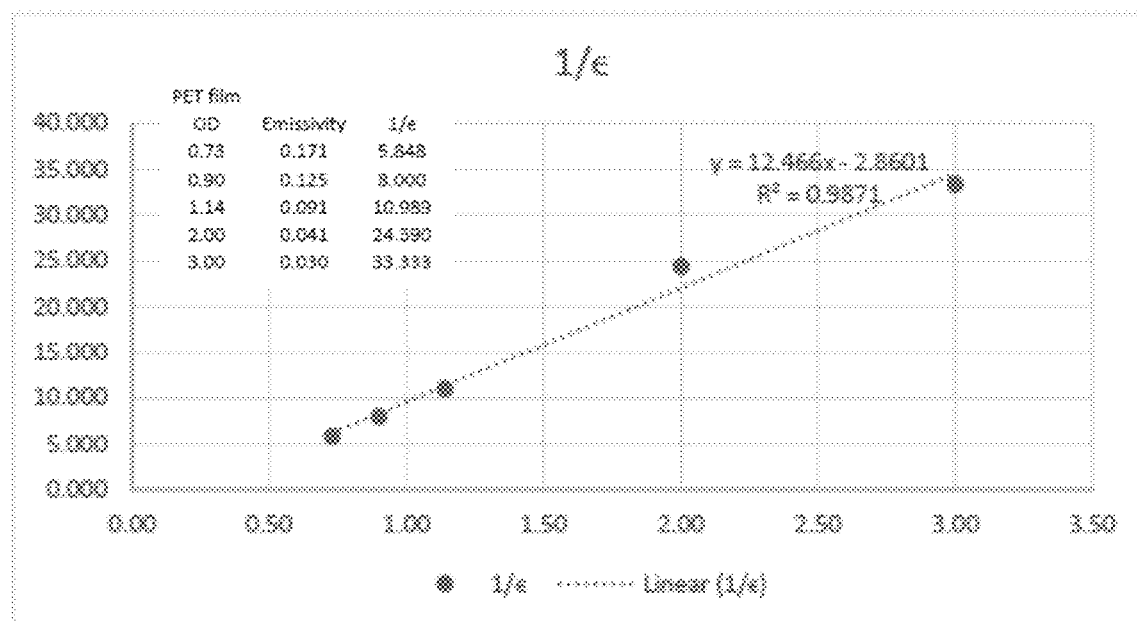
FIG. 2 shows graphical and tabular representations of emissivity of Aluminum Polyester (PET) film as a function of the initial optical density of the film.

Contrary to the prevailing, in related industry, opinion that an aluminum component of the radiant barrier or reflective insulation (as well as other non-paper products) must be prevented from being collected in the pulp for fear of contamination of the paper in the paper repulping and recycling processes, small amounts of aluminum are both undetectable and harmless to the paper being made. We have empirically found that actually allowing and not actively preventing small amounts of aluminum to enter the pulp is not detrimental to the process, and is a way of allowing a paper-containing radiant barrier material to be recyclable as paper. This result is achieved, according to an implementation of the idea of the invention, because the present aluminum is allowed to fully oxidize at the temperatures and humidity levels used in the test. The resulting aluminum oxide is transparent in visual "spot" testing and does not adhere to pulp in the mechanical "stickies" testing. To this end, FIG. 1 illustrates the optical density of Aluminum Polyester during simulated repulpability test conditions. Here, the reference numeral 101 indicates the graphical line for aluminum polyester with an initial optical density of 1.00 and reference numeral 102 indicates the graphical line for aluminum polyester with an initial optical density of 2.00. As the aluminum material corrodes, the optical density falls. FIG. 2 shows a graphical and tabular representation of the emissivity levels of Aluminum Polyester (PET) film as a function of the initial optical density of the film. As aluminum material corrodes, and the optical density falls, a new (current) value of emissivity can be assessed based on the new (current) value of the optical density. The linear fit allows for extrapolation of an optical density value for a target emissivity value along the fit line.

Appendix B of the "Voluntary Standard for Repulping and Recycling Corrugated Fiberboard Treated to Improve Its Performance in the Presence of Water and Water Vapor" (available at corrugated.org/wp-content/uploads/PDFs/Recycling/and incorporated herein by reference) discusses causes for rejection of the pulp. Once the pulp is produced, "spots" are evaluated. There are three methods it specifically calls out to identify "spots": TAPPI T 537 is a dirt count estimator, TAPPI T 277 is a method of identifying a sticky substance that adheres to the pulp, and TAPPI T 563 uses image analysis to measures visual discoloration over an area. (The description of each of these methodologies is available, for example, at standards.globalspec.com/std/1359444/tappi-t-537, standards.globalspec.com/std/1682094/tappi-t-277, and standards.globalspec.com/std/9918295/tappi-t-563, respectively, and is incorporated by reference herein.)

Figure 3:
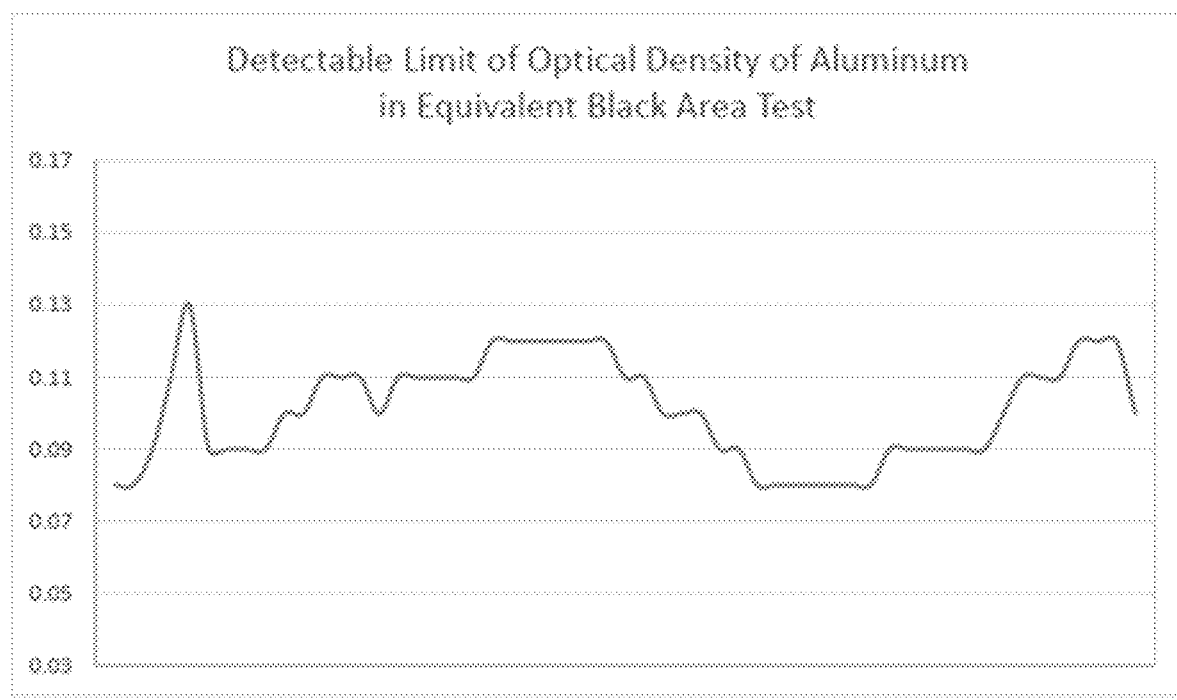
FIG. 3 is a plot of the detectable lower limit of optical density of Aluminum in an Equivalent Black Area (EBA) test.

Specifically, according to the TAPPI T 563 method, a scanner is used to analyze the EBA (equivalent black area) or a dark-colored area on a background of white paper or pulp. Since un-oxidized aluminum is silver-ish or grey-ish in color, and oxidized aluminum is substantially colorless and transparent, the aluminum content of the embodiment of the invention is judiciously chosen such as to be fully oxidized (~oxidized to the extent beyond the limits of the registration/detection capability of the used scanner to recognize such aluminum content as "spot(s)". To this end, FIG. 3 demonstrate a graphical representation of the empirically-determined detectable lower limit of optical density of aluminum in an EBA test.

Aluminum is likely not the only material that would provide a low level of emissivity in use while remaining visually transparent and not pulp-adhering after repulpability and recyclability testing, but aluminum would likely be the most practical in use. For example, silver or indium tin oxide could also satisfy the requirements of the present embodiment, but would likely be prohibitively expensive as compared to aluminum.

Implementation of the present idea includes the use of an aluminized polymeric film—either with a coating less than about one micron in thickness to protect the aluminum from corrosion in use and not raise the emissivity of the aluminized surface greater than 0.10, or with no coating at all if it is not required for normal operation of a packaging article—to keep the emissivity as low as possible. The various layers and combination of layers are shown in FIGS. 4, 5, and 6.

Figure 4:
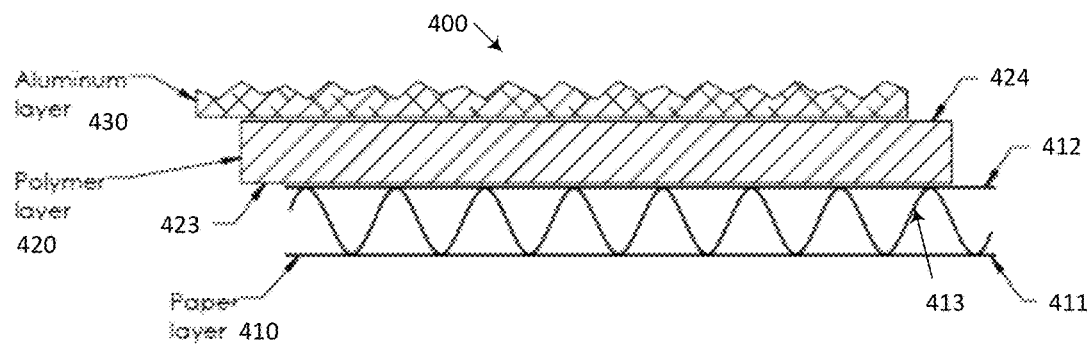
FIGS. 4, 5, and 6 show various layers and combinations of layers of the fully recyclable low-emissivity packaging material.

The embodiment 400 of FIG. 4 contains a paper layer 410 with a first surface 411 and a second surface 412; a polymer layer 420 with a third surface 423 and a fourth surface 424, where the third surface 4233 is affixed to the second surface 412; and an aluminum layer 430 is deposited on the fourth surface 424. The corrugation sub-layer of the paper layer indicated between the surfaces 411, 412 with the line 413, is generally optional.

Figure 5:
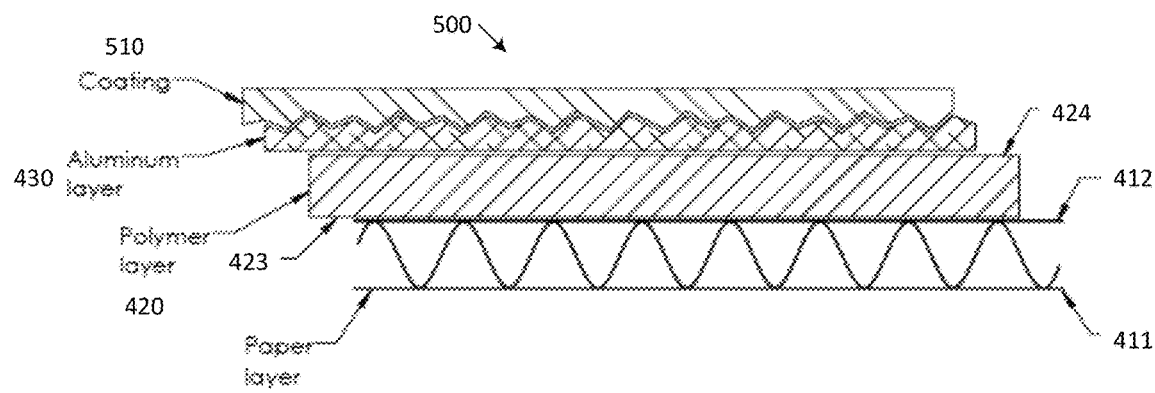

FIG. 5 shows a related structure 500, which, in comparison with the structure 400, additionally contains a protective coating 5 over the aluminum layer 430, where the coating layer 510 is generally less than one micron in thickness.

Figure 6:
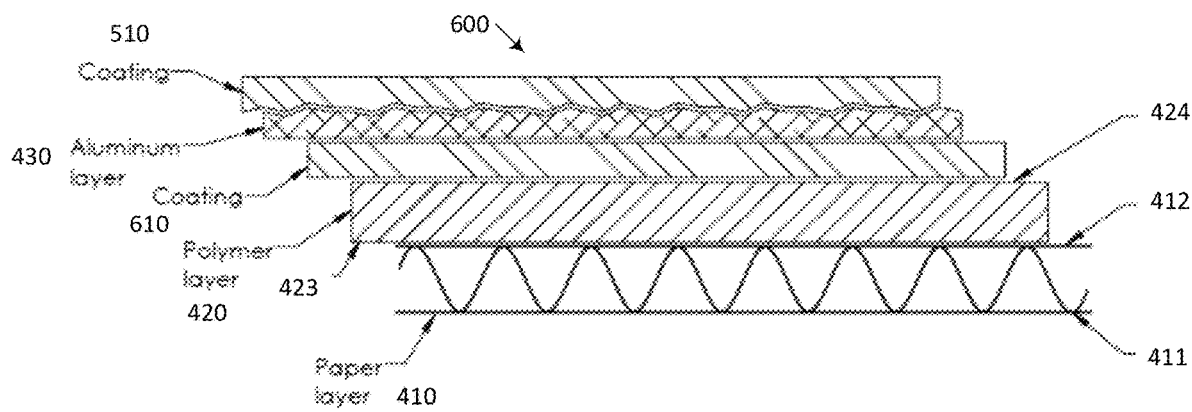

Similarly, FIG. 6 shows a structure 600 that additionally includes a second coating layer 610 disposed between the polymer layer 420 and the aluminum layer 430.

Each of these various layered structures 400, 500, and 600 is configured to ensure that the aluminum-containing portion of the structure is removable during the repulping and recycling process, while the aluminum material on the aluminized film is actually allowed to "crumble" into the pulp as the blender and disintegrator scratches, scrapes and otherwise removes and separates the paper products from the non-paper products, thereby facilitating the propagation of the aluminum material towards and into the accepts area for the pulp—against the conventional wisdom of keeping non-paper components and/or materials out of the pulp. Overall, the result will be a material product configured such that achieves a degree of insulation comparable or better than that of a reflective insulation and that does, when applied to a paper product or component, increase the probability of the final, multilayer product being repulpable and recyclable as regular paper.

Figure 7:
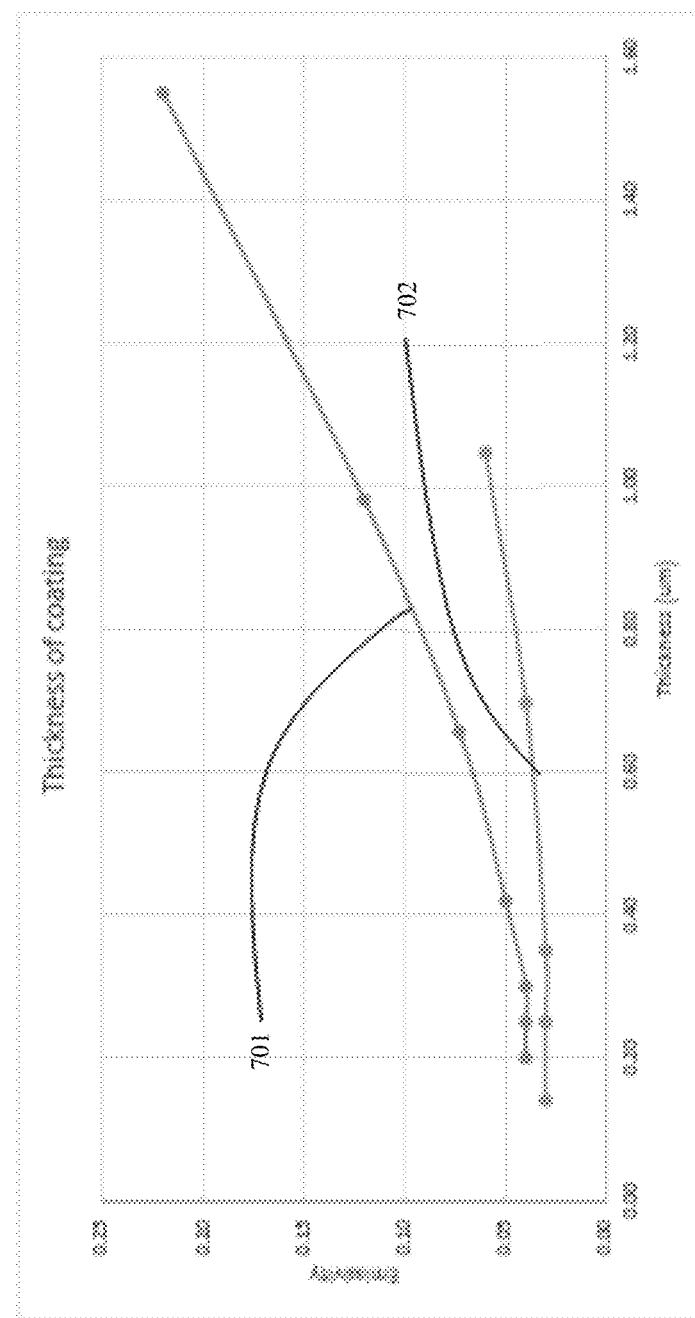
FIG. 7 presents graphical and tabular representations of changes in emissivity values for different types of coatings (Polymer, 201; Wax, 202) in relation to the thicknesses of such coatings.

It was empirically found that there are two requirements that any coating covering the aluminum material of an embodiment of the invention would need to meet. First, such coating has to be such that the coated aluminum material meets the appropriate emissivity requirement to be considered a radiant barrier, (in other words, to demonstrate emissivity of less than or equal to 0.10 when tested to ASTM C1371). FIG. 7 shows how the emissivity of different types of coatings change in relation to the thicknesses of the coatings, where the polymer graph line is indicated with reference numeral 701, and the wax graph line is indicated by reference numeral 702.

Second, the coating must pass the TAPPI T 277 test method, as called out in the "Voluntary Standard For Repulping and Recycling Corrugated Fiberboard Treated to Improve Its Performance in the Presence of Water and Water Vapor" to detect sticky "spots" which would be cause for failure of the standard. For example, during the deposition of fischer tropsch wax (with a 221 F melting point) onto an aluminized film with an initial emissivity of 0.03 (empirically obtained as a result of testing according to the requirements of ASTM C1371), as the thickness of the wax increases from 0.14 microns to 1.05 microns, the emissivity does not increase or otherwise change abruptly, only reaching the value of 0.06 when the wax-coating thickness reaches 1.05 microns. However, the 1.05 micron thick wax is believed to be too thick a layer to pass the "Voluntary Standard for Repulping and Recycling Corrugated Fiberboard Treated to Improve Its Performance in the Presence of Water and Water Vapor", because the presence of the wax material resulted in "stickies" when tested according to TAPPI T 277.

It was discovered that, in order to comply with the "Voluntary Standard for Repulping and Recycling . . . .", the layer of wax should be less than 0.70 microns thick. A sample with a 0.7 micron thick layer of deposited wax was subjected to testing according to the TAPPI T 277 test method. It will be appreciated that a given product can fail the TAPPI T 227 (the "stickies" test) in one of two ways: if a stickie spot count is greater than 15, and if the spot counts are greater than 30% of the control group. Since the results of the conducted test demonstrated on an average just one spot per sheet, it was concluded that, when the thickness of this type of coating is chosen to be less than 0.7 microns, this coating does not contribute to generation of the defects resulting in rejection of the material from the repulpability/recyclability point of view. If a control figure of merit is set at zero spots per sheet, even one per sheet would result in failing the test, so keeping the thickness of the wax coating under 0.7 micron would result in satisfying (meeting) the "Voluntary Standard for Repulping and Recycling . . . ". To this end, FIG. 8 contains a table illustrating the number of "stickies" defects empirically determined when various embodiments of the invention containing coatings made of materials listed in this table were tested according to TAPPI T 277.

Another example of a protective coating would be a radiation-cured acidic acrylic copolymer. This copolymer, when deposited onto an aluminized film with an initial emissivity of 0.03, behaves very different from the wax. As the thickness of the copolymer is increased from 0.20 microns to 1.55 microns (see curve 701 of FIG. 7), the emissivity of the so-coated aluminized film rises at a significantly greater rate than in the case of the wax-coated aluminized film (compare with the curve 702). At a polymer thickness of 0.98 microns, the coated surface has emissivity of 0.12 and, therefore, no longer meets the emissivity requirement that must be met by a radiant barrier. Because the copolymer is a thermoset and not a thermoplastic, it does not soften, melt, or contribute to "stickies" when subjected to testing at 221 F at 100% RH for 4 hours, per the "Voluntary Standard For Repulping and Recycling . . . " and, therefore, passes the required test.

Examples of a reflective insulation packaging product comprising an embodiment of the present invention are various and diverse, and some of such examples are listed below:

A box liner with the thin coated aluminized film facing outward, designed in such a way that when fold and closed has tabs or flanges between ½ and ¾ inches, protruding out from all six sides so that when inserted into a corrugated shipper box, the coated and protected metalized film is facing into air spaces between ½ and ¾ inches;

A standard box with thin coated aluminized film on the outside of the entire box, designed to fit inside a slightly larger box with separate spacers between the inner and outer box;

A single panel of corrugated paper or cardboard with thin coated aluminized film on one side, designed to fit snugly inside a box containing goods where the height of the goods does not reach all the way to the top of the box, and the panel can be inserted with the coated metalized film facing into the above air space;

A standard box where the inside of the box is lined with a thin coated aluminized film, where the goods do not completely fill the box and an air space is created by the size and shape of the goods themselves in relation to the walls of the box.

Examples of normal use of the embodiments of the packaging product of the present invention are substantially dependent on the type of good that is shipped in such packaging product. In one example, if the good is perishable food that needs to remain fresh, the good may require to be at 40 degrees F. on the interior of the packaging while the exterior may be at the ambient in the summer, and while the good would need to maintain its temperature anywhere from 24 to 72 hours (depending on the mode of shipping). On the other hand, if the good is a frozen perishable good, then the internal temperature (in the container or packaging) could be required to be anywhere from 0° to 32° F. If the good is candy or chocolate, then the temperature inside the packaging would be above 32° F. but below 65° F. If the good is a pharmaceutical, then it may be subject to its own unique temperature requirements.

Specific examples of normal use include, but are not limited to, the following examples:

(1) A recyclable cardboard radiant barrier box liner is made with the aluminum surface facing into an airspace between the cardboard liner and the cardboard box. The liner is packaged with 12 lbs. of dry ice and 10 lbs. of frozen beef. The frozen beef starts off at −5° F. and the dry ice at −109° F. The box is shipped through a standard ground service from Los Angeles to Phoenix (48 hours), in the middle of July, when the outside temperature is approximately 75° F. in Los Angeles and 110° F. in Phoenix. The added condensation created by the dry ice may cause an aluminum portion of the packaging to corrode if not coated, so a protective polymer or wax coating may be necessary. Either the recyclable liner itself must be able to insulate against the temperature difference between the goods and the outside air, or else additional insulation would preferably be used (such as foam, cellulose insulation, or perhaps a second recyclable radiant barrier box liner).

(2) A recyclable radiant barrier box is made with the aluminum surface facing inward, toward the goods. The box contains 9 lbs. of chocolate and 5 lbs. of frozen gel packs. The chocolate starting off at 65° F. and the frozen gel packs at 5° F. The box of chocolate is shipped via overnight air transport (24 hours) from Los Angeles to New York, in December. The temperature of outside air starts off at 55° F. in Los Angeles, decreases to about 45° F. in the cargo area of the plane, and is at 35° F. when the shipment arrives in New York. The temperature differences being smaller than in the previous example, and the aluminum facing the inside instead of the outside, means that vapor condensation on the aluminum surface would be unlikely, and a protective coating over the aluminum material in the embodiment of this packaging may not be necessary. The goods, only needing to arrive at or below 65° F., and the external air temperature not being as extreme, means that the insulation required to maintain the required temperature of the goods may be achieved with the recyclable radiant barrier box alone.

(3) A recyclable cardboard radiant barrier insert component is placed at the bottom of a box, which is otherwise insulated with a cotton insulation on the walls and under the lid which would compress under the weight if it was on the bottom. The cardboard radiant barrier insert component is folded or constructed in such a way as to both hold the weight of the payload without compressing and maintain an airspace facing the radiant barrier surface. This insulated box is packed with 8 bottles of juice at 12 oz. each against the insulation on the walls and a 24 oz. frozen gel pack in the center. The juice starts off at 40° F. with the frozen gel pack at 10° F. The insulated box is shipped from San Diego, Calif. to San Francisco, Calif. in early January. The radiant barrier cardboard insert component holds up the weight of the juice, preventing crushing or collapsing of insulation, while at the same time providing reflective insulation to prevent heat gain from the bottom of the box. The air temperature that day in San Diego is 80° F., the overnight the temperature drops to 60° F., and the packaged good arrives in San Francisco where the temperature is 60° F. The juice arrives safely at its destination at a refrigerated temperature of less than 40° F.

(4) A recyclable radiant barrier heavy paper bag, with a radiant barrier facing toward the inside, is enclosed around 9 lbs. of food and 6 lbs. of frozen gel packs, and inserted into a large box as a meal delivery kit. Of the 9 lbs. of food, 3 lbs. are frozen meats that start off at 20° F., and 6 lbs. are fresh fruits and vegetables that start off at 35° F., with 6 lbs. of frozen gel packs placed surrounding the meats. This meal kit ships in the winter from Dallas, Tex. where the temperature is 60° F. and travels by ground to Tulsa, Okla. where the temperature drops down to 40° F. at night and is back up to 60° during the day. The meats arrive at a refrigerated temperate of under 40° F., and the fresh fruits and vegetables are still cool to the touch.

(5) A recyclable radiant barrier box is constructed with outward facing tabs to create air space between it and a larger shipper box, with one radiant barrier surface facing into that air space. The radiant barrier box is filled with 8 frozen tamales at 25° F. No other refrigerant is added. The box ships from Tucson, Ariz. in early February to New York, N.Y. via two day air transportation. The temperature in Tucson is 70° F. the afternoon the package leaves for the terminal and 70° F. the next day before boarding the plane. The temperature decreases to 45° F. in the cargo area of the plane, and the package arrives in New York where the temperature is 40° F. The tamales arrive at a temperature under 40° F.

(6) A recyclable radiant barrier cardboard insert comprises a radiant barrier surface on both sides. The box is constructed with tabs to separate it from an exterior shipping box so that the outward radiant barrier is facing into the air space between it and the shipper box, and the inward radiant barrier is facing into the air space of the interior of the box and any intermittent air spaces created by the positioning of the goods. The good in this case are 32 oz. of refrigerated yogurt and 3 lbs. of frozen gel packs. The frozen gel packs start off at 25° F. and the yogurt starts off at 35° F. The package is shipped from Los Angeles, Calif. to Sacramento, Calif. in the summer via one-day ground shipment. The outside air temperature across the trip is at about 80° F. with little variation. The yogurt is partially frozen for the first 12 hours, but thaws and arrives in Sacramento under 40° F.

In stark contradistinction with technologies of related art, an embodiment of the present invention complies with the repulpability requirement, yet still provides insulation with very low emissivity figure(s). An embodiment may have a metalized film on one side and paper on the other, with the metal facing outwardly. Optionally, a protective top coating can be added, if required. Thus, an embodiment of the invention includes a paper layer with first and second surfaces; a polymer layer with third and fourth surfaces, wherein the third surface is affixed to the second surface and an aluminum layer is deposited on the fourth surface. Optionally, an embodiment of the invention may include an intermediate layer, where the purpose of the intermediate layer may be to smooth the fourth surface prior to applying the aluminum in order to achieve better emissivity, or it may serve the purpose of being easily removable in order to separate the aluminum from the fourth surface after use. The intermediate layer may, for example, be a polymer or an oligomer.

The packaging product would possess the emissivity of well under 0.10, and typically closer to 0.05. This would give it superior insulating performance.

The packaging product would pass the "Voluntary Standard . . . ", as empirical discovery of how vacuum deposited aluminum behaves during the "Voluntary Standard . . . " test. If the aluminum is allowed to oxidize under the conditions of the test, then the transparent aluminum oxide can be mixed in the pulp and not be cause for failure.

As is well known in related art, the industry has been so concerned with aluminum showing up in the pulp (which does happen in the case of the use of aluminum foil) that either the aluminized plastic is not used at all, or else the aluminum portion is fully encapsulated, which solution both adds weight (which could still cause a failure of the Voluntary Standard) and increases emissivity (which significantly diminishes the insulation performance).

However, in contradistinction with the products of related art, when applied to 60 lb. kraft paper, as might be configured to make an insulated pouch for example, the single layer of 48 gauge PET complemented with the aluminum and top coating layers as proposed in this disclosure results in meeting the 85%/15% weight criteria for the repulpability test according to the Voluntary Standard.

A summary of the comparison between the existing technologies and an embodiment of the present invention is shown with reference to two possible products:

Product 1: An insulating pouch using a strong and heavy paper, with a reflective surface on one side, where the reflective surface is:

The film/aluminum/film product—neither low emissivity nor recyclable;

Aluminum foil—very low emissivity but is not recyclable;

Metalized paper—recyclable and somewhat low emissivity;

An embodiment of the present invention—both recyclable and very low emissivity.

Product 2: An insulating box or insert for a box, using cardboard, with a reflective surface on one side where the reflective surface is:

The film/aluminum/film product—not low emissivity, but may be recyclable depending on the weight and type of cardboard used;

Aluminum foil—very low emissivity but is not recyclable;

Metalized paper—recyclable and somewhat low emissivity;

An embodiment of the present invention—both recyclable and very low emissivity.

Thus, as illustrated in the above examples, an embodiment of the present invention may be successfully used to effectively insulate an object during shipment, mail delivery, etc. with the added benefit that the packaging may then be recycled once it has served its purpose. The method of packaging an object that is perishable, or may otherwise be temperature sensitive, comprises placing the object in suitable proximity to an embodiment of the invention such that adequate thermal insulation is provided. Adequate thermal insulation (of an object or good) is defined as protection (of such good) from heat, cold, or changes between heat and cold, such that the desired temperature range of such object is maintained during and throughout the shipment, mail delivery, etc. time frame.

As broadly used and described herein, the reference to a material layer being "carried" on a surface of a chosen element refers to a material layer that is disposed directly on the surface of such chosen element or disposed on another coating, layer or layers that are disposed directly on the surface of the chosen element. For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein.

For example, related embodiments provide a receptacle (that is, a container or device configured to receive and hold contents in a cavity defined by the walls of the container) that includes (i) a first shell made from a first material and defining a first cavity therein, the cavity having a first volume, the shell having a first surface facing outwardly and a second surface facing inwardly towards the cavity, said first and second surfaces being separated by a thickness of the shell, and (ii) at least one piece of second material having a third surface and disposed inside the first volume with the third surface facing the second surface and separated from the second surface by a target separation distance. Here, the target separation distance is greater than 3 millimeters; any of the second and third surfaces is metallized. A metallized surface of the receptacle is characterized by an energy-radiating parameter of no greater than 0.1, while an energy-radiating parameter of the first surface is no less than 0.50. The receptacle is recyclable. In one implementation, the at least one piece of the second material is configured as a second shell defining a second cavity therein, the second cavity having a second volume, the second shell having the third surface facing outwardly towards the second surface and a fourth surface facing inwardly towards the second cavity. In a specific case of such implementation, any of the third and fourth surfaces is metallized.

Embodiments also provide a receptacle that includes (i) a first shell made from a first material and defining a first cavity therein, the cavity having a first volume, the shell having a first surface facing outwardly and a second surface facing inwardly towards the cavity, the first and second surfaces being separated by a thickness of the shell, and (ii) at least one piece of second material having a third surface and disposed inside the first volume with the third surface facing the second surface and separated from the second surface by a target separation distance of greater than 3 millimeters. Here, any of the second and third surfaces is metallized, and an emissivity of a metallized surface of the receptacle is no greater than 0.1 while an emissivity of the first surface is no less than 0.50. The receptacle is recyclable. In one implementation, any of the second and third surfaces is metallized while the first surface is not metallized. Alternatively or in addition, at least one piece of the second material is configured as a second shell defining a second cavity therein, the second cavity having a second volume, the second shell having the third surface facing outwardly towards the second surface and a fourth surface facing inwardly towards the second cavity.

Accordingly, the invention should not be viewed as being limited to the disclosed embodiment(s).

What is claimed is:

1. A recyclable packaging comprising:
a stack including
a paper layer with first and second surfaces;
a polymer layer with third and fourth surfaces, wherein the third surface is affixed to the second surface;
an intermediate coating layer applied to the fourth surface;
an aluminum layer carried by the intermediate coating layer, wherein the aluminum layer has a first thickness of 200 nanometers or less;
wherein said stack has emissivity that is equal to or smaller than a first value of 0.10 as perceived through an outer surface of the aluminum layer; and
wherein, when said packaging is subjected to treatment that includes
a) blending the packaging in a blender;
b) disintegrating into water with a British Disintegrator at a temperature within a range from about 115 degrees F. to about 135 degrees F. at 3000 rpm;
c) separating in a 0.01 inch aperture screen with a 1 inch water head for 20 minutes; and
d) drying in an oven for 4 hours at 221 degrees F.
to form a recyclable material, said aluminum layer becomes fully oxidized with no visible aluminum present in said recyclable material,
and further comprising
a protective coating layer disposed over the aluminum layer, wherein the protective coating layer has a second thickness of 1 micron or less, and wherein the second thickness is configured i) to maintain the emissivity at the first value after the aluminum layer has been coated with the protective coating and ii) to prevent oxidation of the aluminum layer during normal use of the packaging, while not impeding oxidation of the aluminum layer as a result of the treatment.

2. The recyclable packaging of claim 1, wherein the aluminum layer is disposed directly on the intermediate coating.

3. The recyclable packaging of claim 1, wherein the intermediate coating has the intermediate coating thickness between 10 nm and 2000 nm and includes a material selected from polymer and oligomer.

4. The recyclable packaging of claim 1, wherein the protective coating includes a material selected from: wax, polymer, and lacquer.

5. The recyclable packaging of claim 1, wherein the polymer layer includes a material selected from: low density polyethylene, high density polyethylene, polyethylene terephthalate, polypropylene, polyvinyl chloride, polyurethane, and polystyrene.

6. The recyclable packaging of claim 1, wherein the polymer layer is a material selected from: film and fabric.

7. A method for manufacturing a recyclable packaging, the method comprising:
forming a packaging layer stack by:
attaching a polymer layer to a paper layer, wherein an inner surface of the polymer layer is affixed to a first surface of the paper layer;
depositing an aluminum layer on the polymer layer, wherein the aluminum layer has a first thickness of 200 nanometers or less, and wherein the aluminum layer causes said packaging layer stack to have emissivity that is equal to or smaller than a first value of 0.10; and
wherein said aluminum layer is configured to acquire optical density (OD) of less than 0.09 when the packaging layer stack is exposed to a treatment that includes:
a) blending the packaging stack in a blender;
b) disintegrating into water with a British Disintegrator at a temperature within a range from about 115 degrees F. to about 135 degrees F. at 3000 rpm,
c) separating an output from step b) in a 0.01 aperture inch screen with a 1 inch water head for 20 minutes, and
d) drying in an oven for 4 hours at 221 degrees F.

8. The method of manufacturing a recyclable packaging of claim 7, further comprising:
applying a protective coating over the aluminum layer to form a coated packaging layer stack, wherein the protective coating has a second thickness of 1 micron or less, and wherein the second thickness is defined
a) to maintain the emissivity of the packaging layer stack at the first value after the aluminum layer has been coated with the protective coating and
b) to prevent oxidation of the aluminum layer during normal use of the recyclable packaging, while the protective coating does not impede oxidation of the aluminum layer during the treatment.

9. A recyclable packaging comprising:
a stack including
a paper layer with first and second surfaces;
a polymer layer with third and fourth surfaces, wherein the third surface is affixed to the second surface;
an aluminum layer deposited on the fourth surface, wherein the aluminum layer has a first thickness of 200 nanometers or less and wherein the aluminum layer causes an emissivity of an outer surface of the recyclable packaging to be equal to or smaller than a first value of 0.10; and
wherein said aluminum layer acquires an optical density (OD) of less than 0.09 with no visible aluminum present in a recyclable material that results from the recyclable packaging being subjected to a treatment, the treatment including
a) blending the packaging in a blender to form a first material;
b) disintegrating the first material into water with a British Disintegrator at a temperature within a range from about 115 degrees F. to about 135 degrees F. at 3000 rpm to form a second material;
c) separating the second material in a 0.01 inch aperture screen with a 1 inch water head for 20 minutes to form a fourth material; and
d) drying the fourth material in an oven for 4 hours at 221 degrees F.

10. The recyclable packaging of claim 9, further comprising:
a protective coating over the aluminum layer,
wherein the protective coating has a second thickness of 1 micron or less,
wherein the second thickness is defined to maintain the first value of the emissivity of the recyclable packaging after the aluminum layer has been coated with the protective coating and to prevent oxidation of the aluminum layer during normal use of the packaging,
wherein the protective coating does not impede oxidation of the aluminum layer during the treatment.

11. The recyclable packaging of claim 10, wherein the protective coating includes a material selected from: wax, polymer, and lacquer.

12. The recyclable packaging of claim 9, wherein the polymer layer includes a material selected from: low density polyethylene, high density polyethylene, polyethylene terephthalate, polypropylene, polyvinyl chloride, polyurethane, and polystyrene.

13. The recyclable packaging of claim 9, wherein the polymer layer includes a material selected from: film and fabric.

14. A method for thermally insulating a good within a recyclable packaging, the method comprising:

placing a reflective insulation material in a pre-defined proximity with the good, the pre-defined proximity being suitably chosen to provide adequate thermal insulation to the good, wherein said reflective insulation material comprises the recyclable packaging that includes:

a paper layer with first and second surfaces;

a polymer layer with third and fourth surfaces, wherein the third surface is affixed to the second surface;

an aluminum layer deposited on the fourth surface, wherein the aluminum layer has a first thickness of 200 nanometers or less and wherein the aluminum layer causes an emissivity of the recyclable packaging to be equal to or smaller than a first value of 0.10; and wherein said aluminum layer becomes fully oxidized with no visible aluminum present in a recyclable material that results from the recyclable packaging being subjected to a treatment that includes a) blending the packaging in a blender to form a first material;

b) disintegrating the first material into water with a British Disintegrator at a temperature within a range from about 115 degrees F. to about 135 degrees F. at 3000 rpm to form a second material;

c) separating the second material in a 0.01 inch screen with a 1 inch water head for 20 minutes to form a fourth material; and d) drying the fourth material in an oven for 4 hours at 221 degrees F.

15. A method for thermally insulating a good within a recyclable packaging, the method comprising:

placing a reflective insulation material at a pre-defined proximity distance from the good, said pre-defined proximity distance chosen to provide adequate thermal insulation to the good, wherein said reflective insulation material comprises the recyclable packaging that includes:

a paper layer with first and second surfaces;

a polymer layer with third and fourth surfaces, wherein the third surface is affixed to the second surface;

an intermediate coating layer applied to the fourth surface;

an aluminum layer carried by the intermediate coating, wherein the aluminum layer has a first thickness of no more than 200 nanometers to cause the recyclable packaging to have emissivity that is equal to or smaller than a first value of 0.10; and wherein said aluminum layer is configured to acquire optical density (OD) of less than 0.09 and become fully oxidized with no visible aluminum present in a recyclable material when the recyclable packaging is subjected to a treatment that includes a) blending the packaging in a blender to form a first material;

b) disintegrating the first material into water with a British at a temperature within a range from about 115 degrees F. to about 135 degrees F. at 3000 rpm to form a second material;

c) separating the second material in a 0.01 inch aperture screen with a 1 inch water head for 20 minutes to form a fourth material; and d) drying the fourth material in an oven for 4 hours at 221 degrees F.

\* \* \* \* \*